United States Patent [19]

Zeltzer

[11] Patent Number: 4,998,817

[45] Date of Patent: Mar. 12, 1991

[54] CONTACT LENS FOR CORRECTION OF COLOR BLINDNESS

[76] Inventor: Harry I. Zeltzer, 107 High St. - P.O. Box 209, Ipswich, Mass. 01938

[21] Appl. No.: 522,067

[22] Filed: May 10, 1990

Related U.S. Application Data

[63] Continuation of Ser. No. 731,763, May 8, 1985, abandoned, which is a continuation of Ser. No. 559,969, Dec. 9, 1983, abandoned.

[51] Int. Cl.⁵ .................................................. G02C 7/04
[52] U.S. Cl. .................................. 351/162; 351/160 H
[58] Field of Search ............... 351/160 R, 160 H, 161, 351/162

[56] References Cited

U.S. PATENT DOCUMENTS

| | | | |
|---|---|---|---|
| 3,034,403 | 5/1962 | Neefe | 351/162 |
| 3,701,590 | 10/1972 | Zeltzer | 351/162 |
| 4,252,421 | 2/1981 | Foley, Jr. | 351/162 |

Primary Examiner—Scott J. Sugarman
Attorney, Agent, or Firm—Joseph Zallen

[57] ABSTRACT

A corneal contact lens for the correction of color blindness, which is clear except for a thin red exterior layer covering the area admitting light to the pupil.

1 Claim, 1 Drawing Sheet

CONTACT LENS FOR CORRECTION OF COLOR BLINDNESS

This application is a continuation of the application Ser. No. 06/731,763 filed May 8, 1985, now abandoned, which in turn is a continuation of Ser. No. 06/559,969 filed Dec. 9, 1983, now abandoned.

BACKGROUND OF INVENTION

A soft corneal contact lens which improves the color discrimination of a color-blind person when applied to one eye only, said lens comprising a clear, soft, corneal contact lens having on the central portion of its exterior surface a thin layer of red coloration characterized as being insoluble in water but soluble in aromatic hydrocarbon; light passing through the red layer having substantially all its transmissions above about 6000 Å; said red layer continuously covering substantially all the light normally admitted to the pupil of the eye during the daytime and being in line with the axis of the pupil; said lens being sufficiently large to enable ready and stable centration without jeopardizing oxygen transmission.

This invention relates to the use of corneal contact lenses for the correction of color blindness, in particular, soft or gas-permeable lenses.

U.S. Pat. No(s). 3,586,423 and 3,701,590 describe red-colored contact lenses which can be used to correct color blindness. In particular lenses illustrated in these patents and those made commercially under those patents are colored throughout with a red coloration. Whereas such coloration throughout the lens is satisfactory for so-called hard lenses made from plastic, it has been difficult to fashion a soft lens or a gas-permeable lens wherein the color remains uniformly distributed throughout the lens.

One object of the present invention is to provide a soft or gas-permeable contact lens containing red coloration which can be used for the correction of color blindness and which is relatively simple to manufacture.

Other objects and advantages of this invention will be apparent from the description and claims which follow taken together with the appended drawings.

SUMMARY OF INVENTION

This invention comprises generally a central red zone in an otherwise clear contact lens. In its preferred form a thin layer of red coloration is placed on the center of the external surface of a clear corneal contact lens. This invention is applicable to hard, soft and gas-permeable contact lenses. The central red coloration is in line with the axis of the pupil and is preferably of a diameter such as to cover light entering the pupil, the remainder of the lens being clear. The coloration may be applied by painting, silk screening, stamping, or imprinting. Light having a wave length of below about 6000 Å is substantially all absorbed. The red zone of the lens has transmissions of at least 60% of light of a wave length above about 6000 Å.

A lens made in accordance with this invention typically has a lens thickness in the order of 0.15 mm. The size of the lens depends somewhat on the size of the eye to be fitted and is in the range of 11–15 mm, the average diameter of the cornea of an eye being 12 mm. However, many individuals have diameters which are larger or smaller and eyelid openings which are larger or smaller. Similarly the average radius of a cornea is between 42 and 44 diopters but many corneas are steeper and flatter. Proper positioning of the lens of the present invention on a cornea is dependent on these factors as well as weight.

Figure 3:
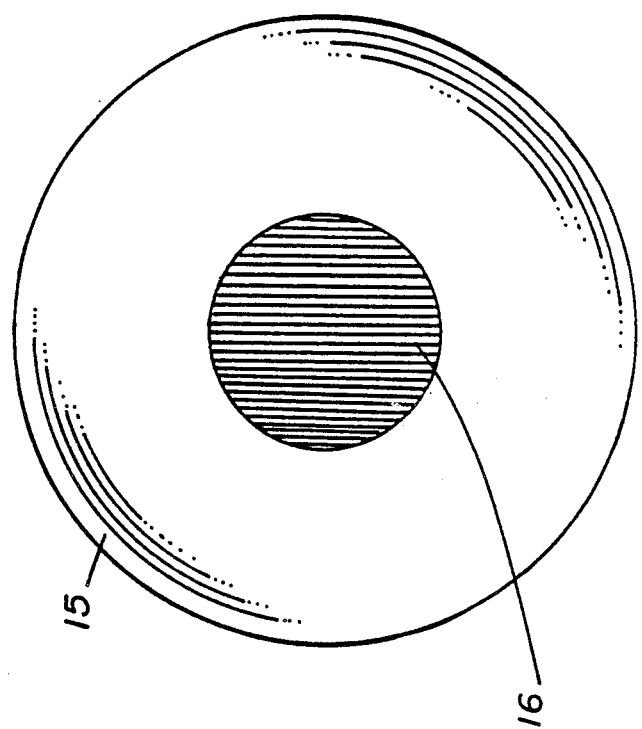
FIG. 3 is a front view of the lens alone.
Figure 2:
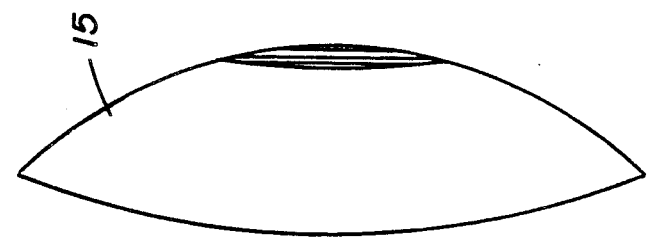
FIG. 2 is a side view of the lens alone.
Figure 1:
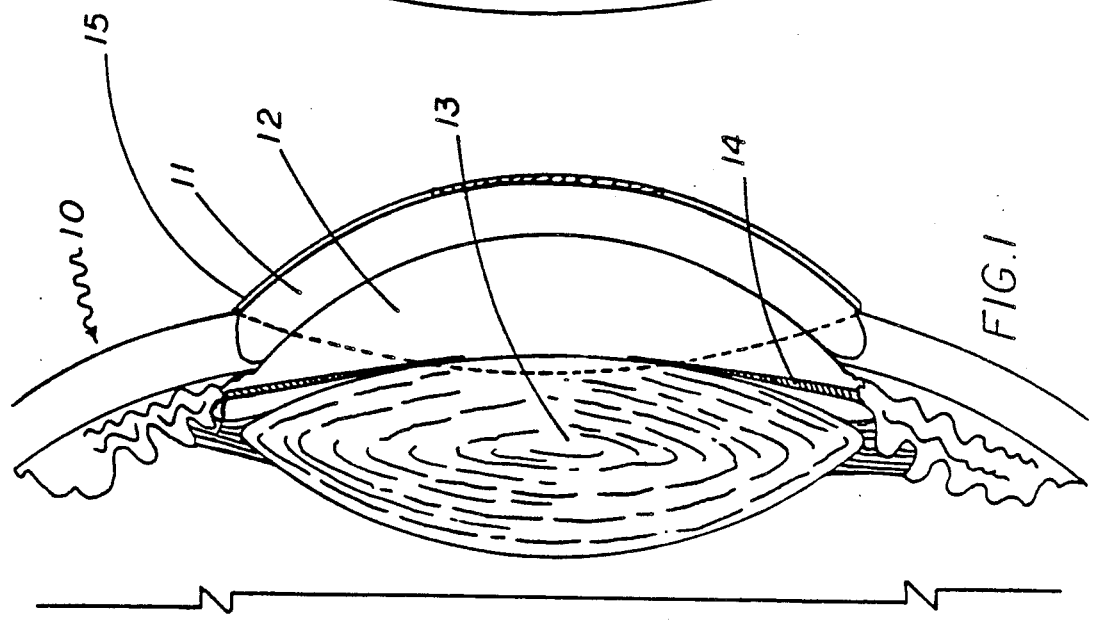
FIG. 1 is a diagrammatic section of an eye with a lens of this invention in position on the cornea of the eye.

The lens 15 is seated on the cornea 11 of the eye 10 so that the external central red-colored area 16 covers the light entering the eye through the cornea 11, anterior chamber 12, pupil of the iris 14, and eye lens 13.

SPECIFIC EXAMPLES OF INVENTION

EXAMPLE 1

A clear soft corneal contact lens having a diameter of 14.5 mm was coated on its spherical external center with a thin layer of red dye solution on an area having a diameter of 6 mm. The colored area which is at the corneal apex is in the axis of the pupil of the eye. The application of the thin red layer was limited to the center area and the rest of the lens was left clear. The particular dye used was Passaic Color and Chemical Co. "Oil Red 2144" which is insoluble in water but soluble in aromatic hydrocarbon. Transmission of light through the red spot was substantially all above 6000 Å with very little transmission below.

EXAMPLE 2

A clear gas-permeable contact lens having a diameter of 14.5 mm was coated on its exterior center in the manner specified in Example 1. Transmission of light through the red spot was similar to that in Example 1.

Upon clinical tests, I found that a thin red layer of this sort which covered the pupil was sufficient to provide a similar increase in color discrimination as when the entire lens was red colored.

The soft and gas-permeable lenses of this invention are not only more comfortable to wear, but can be worn for much longer periods of time than a hard lens. In addition, since the colored area is much smaller there is a marked reduction in the color an observer notes in the eye. Further, the lens can be made sufficiently large to enable ready and stable centration, without jeopardizing oxygen-transmission.

I claim

1. A soft corneal contact lens which improves the color discrimination of a color-blind person when applied to one eye only, said lens comprising a clear, soft, corneal contact lens having on the central portion of its exterior surface a thin layer of red coloration characterized as being insoluble in water but soluble in aromatic hydrocarbon; light passing through the red layer having substantially all its transmissions above about 6000 Å; said red layer continuously covering substantially all the light normally admitted to the pupil of the eye during the daytime and being in line with the axis of the pupil; said lens being sufficiently large to enable ready and stable centration without jeopardizing oxygen transmission.

* * * * *